United States Patent Office 3,637,858
Patented Jan. 25, 1972

3,637,858
STABILISED MONOMERIC GLYOXAL SOLUTIONS
Andrew Harper Dinwoodie, Dalry, and George Gourlay, Stevenston, Scotland, assignors to Imperial Chemical Industries Limited, London, England
No Drawing. Filed Apr. 19, 1968, Ser. No. 722,567
Claims priority, application Great Britain, May 3, 1967, 20,612/67
Int. Cl. C07c 47/02
U.S. Cl. 260—601                     1 Claim

ABSTRACT OF THE DISCLOSURE

Stabilised monomeric glyoxal solutions comprise anhydrous monomeric glyoxal, a free-radical inhibitor and an anhydrous organic solvent.

---

This invention relates to stabilished solutions of monomeric glyoxal in anhydrous organic solvents and to their preparation. These solutions provide a convenient source of monomeric glyoxal, a highly reactive chemical intermediate of use in preparing, for example, polymers and copolymers of glyoxal.

In accordance with the invention a stabilished solution of monomeric glyoxal comprises anhydrous monomeric glyoxal and a free-radical inhibitor which is inert to monomeric glyoxal dissolved in an anhydrous organic solvent which is inert to monomeric glyoxal.

The anhydrous monomeric glyoxal may conveniently be prepared by heating hydrated glyoxal, which is usually polymeric, in suspension in a silicone fluid as heat-exchanging medium at a temperature of 120–185° C. as described in our co-pending U.S. patent application S.N. 721,147, now Pat. No. 3,542,879, issued Nov. 24, 1970. It is a greenish-yellow liquid, M.P. 15° C., B.P. 50.4° C., which is rapidly polymerised on contact with moisture to form a polymeric glyoxal hydrate which is slowly soluble in water. It is also polymerised by exposure to ultra-violet light.

Suitable organic solvents for the solutions of the invention include ethers, hydrocarbons and halogenohydrocarbons such as, for example, diethyl ether, tetrahydrofuran, petroleum ether (60–80° C. boiling range), benzene, carbon tetrachloride, chloroform, methylene chloride and 1,2-difluorotetrachloroethane (Arcton 114).

Convenient free-radical inhibitors include quinonoid compounds such as hydroquinone, hydroquinone dimethyl ether or chloroanil, of which chloroanil is preferred.

The storage life of the solutions may be further improved by storage in amber bottles, or in the dark or at low temperatures.

In accordance with a further aspect of the invention a stabilised solution of monomeric glyoxal is prepared by dissolving monomeric glyoxal in an anhydrous organic solvent which is inert to glyoxal in presence of a free-radical inhibitor which is also inert to monomeric glyoxal. The solution should preferably be prepared under a dry atmosphere. Conveniently, anhydrous monomeric glyoxal is collected after its preparation in traps cooled to −78° C. and to prepare the solution the anhydrous organic solvent may be placed in the traps, the solution being formed as the trap warms up. Alternatively, the anhydrous organic solvent may be added to the monomeric glyoxal at ambient temperature after collection in the preparation apparatus.

The stabilised solutions of the invention are further illustrated by the following examples in which all parts and percentages are by weight.

EXAMPLE 1

Glyoxal monomer was prepared by the thermal depolymerisation of glyoxal monohydrate and dissolved in anhydrous tetrahydrofuran at −78° C. to give a solution containing 10 parts of glyoxal monomer in 90 parts of anhydrous tetrahydrofuran. The resultant solution was split into three portions. To two of these were added 0.5 part of stabiliser and the third was left as a blank. The stabilisers used were chloranil and hydroquinone dimethyl ether. The solutions were stored at room temperature in amber bottles fitted with serum caps through which samples could be removed for analysis. The amount of glyoxal contained in the solution was determined by ultraviolet spectrographic analysis at 192 m$\mu$., 207 m$\mu$., or 250 m$\mu$. against a blank of the solvent and inhibitor.

The results obtained are shown in Table 1.

TABLE 1

| | Stabiliser | | |
|---|---|---|---|
| | Chloranil | Hydroquinone dimethyl ether | Blank |
| | Percent of glyoxal monomer in solution | | |
| Day storage: | | | |
| 0 | 10 | 10 | 10 |
| 7 | 9 | 4.5 | 4.5 |
| 10 | 7.9 | 3.6 | 3.5 |
| 14 | 7.5 | 3.5 | 3.2 |
| 17 | 7.5 | 3.3 | 2.5 |
| 21 | 7.5 | 3.3 | 1.8 |
| 24 | 7.4 | 3.3 | 0.6 |
| 28 | 7.4 | 3.2 | 0.0 |
| 31 | 7.4 | 3.2 | 0.0 |
| 35 | 7.4 | 3.2 | 0.0 |

EXAMPLE 2

A solution containing 10 parts of glyoxal monomer in 90 parts of anhydrous benzene was prepared and split into 3 portions. 0.5 part of chloranil and hydroquinone dimethyl ether were added to two of the portions and the third was left as a blank. The solutions were stored at room temperature in amber bottles and the glyoxal monomer estimated periodically.

The samples to which chloranil and hydroquinone dimethyl ether had been added showed a marked improvement in stability. After a period of 25 days the stabilised solutions contained about 8 parts of glyoxal monomer per 100 parts of solution, whereas the unstabilised solution contained a substantial precipitate of glyoxal polymer and 6 parts of the glyoxal monomer.

After the initial period of 25 days the benzene solutions were opened to the atmosphere for 30 seconds at intervals of 3 days, conditions which would normally produce very rapid polymerisation of glyoxal monomer. After a further nine days, analysis showed that this treatment had had very little effect on the stability of the stabilised solutions. However, the glyoxal monomer concentration of the unstabilised solution decayed at a much greater rate than hitherto.

EXAMPLE 3

A solution of 40 parts glyoxal monomer, 0.5 part chloranil and 60 parts anhydrous chloroform was prepared. The solution was stored at room temperature in an amber bottle and compared periodically with a solution of 40 parts of glyoxal monomer in 60 parts of anhydrous chloroform as described in Example 1.

After 20 days the unstabilised solution contained no monomeric glyoxal whereas the chloranil stabilised solution contained 24 parts of glyoxal monomer per 100 parts of solution.

EXAMPLE 4

A solution of 100 parts of glyoxal monomer in 90 parts of anhydrous methylene chloride was prepared as described in Example 1.

The solution was split into several portions to which were added 0.5 part of stabiliser per 100 parts of solution. The solutions were placed in amber bottles, at room temperature, from which samples were withdrawn periodically and the glyoxal monomer concentration determined by ultra-violet spectrographic analysis. Details of the stabilisers added and the results obtained are shown in Table 2.

TABLE 2

| | Stabiliser | | | |
|---|---|---|---|---|
| | Blank | Hydro-quinone | Chloranil | Hydro-quinone dimethyl ether |
| | Percent of glyoxal monomer in solution | | | |
| Time (days): | | | | |
| 0 | 10 | 10 | 10 | 10 |
| 5 | 3.9 | 6.0 | 8.9 | 6.4 |
| 7 | 2.0 | 4.8 | 8.0 | 5.5 |
| 14 | 1.5 | 2.4 | 7.0 | 1.5 |

EXAMPLE 5

A solution of 12.7 parts glyoxal monomer, 0.4 part chloranil and 74.3 parts anhydrous tetrahydrofuran was prepared. The solution was stored in the dark at −20° C. in a clear glass bottle fitted with a serum cap. The solution remained clear and after 21 days a sample removed showed unaltered glyoxal content. After 28 days the glyoxal content had fallen only slightly to 12.3 parts.

EXAMPLE 6

A solution of 20.8 parts glyoxal monomer, 0.2 part chloranil and 196.6 parts anhydrous chloroform was prepared. The solution was stored in the dark at −20° C. in a clear glass bottle fitted with a serum cap. After 8 days the glyoxal content was 19.4 parts and after 15 days it was 17.1 parts.

EXAMPLE 7

A solution of 15.9 parts glyoxal monomer, 0.2 part chloranil and 130.9 parts anhydrous methylene chloride was prepared. The solution was stored in the dark at −20° C. in a clear glass bottle fitted with a serum cap. After 8 days the glyoxal content was 14.8 parts and after 15 days it was 13.0 parts.

What we claim is:

1. A stabilised solution of monomeric glyoxal comprising anhydrous monomeric glyoxal and a stabilizing amount of chloranil in an anhydrous solvent selected from the group consisting of diethyl ether, tetrahydrofuran, petroleum ether, benzene, carbon tetra-chloride, chloroform, methylene chloride and 1,2-difluoro-tetra-chloroethane.

References Cited

UNITED STATES PATENTS 2,463,030  3/1949  Guest et al. _____ 260—601

FOREIGN PATENTS 714,249  8/1954  Great Britain _____ 260—601

OTHER REFERENCES

Union Carbide Chemicals, General Chemistry of Glyoxal, 1965.

LEON ZITVER, Primary Examiner

R. H. LILES, Assistant Examiner